United States Patent Office 2,817,654
Patented Dec. 24, 1957

2,817,654

AZO DYESTUFFS

Philippe Grandjean, Markus Kappeler, Lukas Schneider, and Willy Steinemann, Basel, and Walter Wehrli, Riehen, Switzerland, assignors, by mesne assignments, to Saul & Co., Newark, N. J., as nominee of Fidelity Union Trust Company, executive trustee under Sandoz Trust No Drawing. Application June 15, 1953
Serial No. 361,829

Claims priority, application Switzerland June 16, 1952

6 Claims. (Cl. 260—147)

The present invention relates to valuable disazo and polyazo dyestuffs and to the preparation thereof.

In accordance with the present invention two mols of an aminoazo compound of the formula

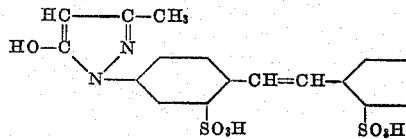

wherein R stands for a radical of the benzene or naphthalene series, other than the ortho-carboxybenzene, ortho-carboxybenzene-meta-sulfonic acid and ortho-carboxybenzene-para-sulfonic acid radicals, and wherein the R radical may contain in ortho-position to the —N=N— a group which is capable of metal complex formation and may also contain additional substituents including arylazo substituents, or two mols of the corresponding metallized aminoazo compound, or two mols of a mixture of two such aminoazo compounds, in one of which R may be the ortho-carboxybenzene, ortho-carboxybenzene-meta-sulfonic acid or ortho-carboxybenzene-para-sulfonic acid radical, or a mixture of one mol of such aminoazo compound (I), wherein R has the initially-recited significance, but including the ortho-carboxybenzene, ortho-carboxybenzene-meta-sulfonic acid or ortho-carboxybenzene-para-sulfonic acid radical, with one mol of any other aminoazo compound or one mol of an amino compound of any other composition and which is capable of coupling, are condensed with one mol of a dicarboxylic acid halide of the formula $$\text{Hal—CO—C}x\text{=CH—CO—Hal} \quad \text{(II)}$$

wherein Hal stands for chlorine or bromine, and $x$ stands for hydrogen, chlorine, bromine or methyl. Thereafter, if necessary and, if desired, after preliminary coupling with a suitable diazo compound, the obtained disazo or polyazo dyestuff is treated in substance or on the fiber with a metal-yielding agent.

A further embodiment of process according to which a series of disazo and polyazo dyestuffs of the present invention can be prepared, involves coupling one mol of a dipyrazolone of the formula

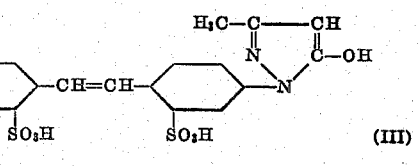

(III)

wherein $x$ has the previously-recited significance, with two mols of the diazo compound of an amine of the benzene or naphthalene series, other than 1-aminobenzene-2-carboxylic acid or 1-amino-4-sulfobenzene-2-carboxylic acid or 1-amino-5-sulfobenzene-2-carboxylic acid, which amine may be substituted in ortho-position to the amino group by a group which is capable of metal complex formation and which may also bear additional substituents including arylazo substituents, or simultaneously or in any desired sequence with two mols of two mutually different such diazo components, of which one may be the diazo component of 1-aminobenzene-2-carboxylic acid or 1-amino-4-sulfobenzene-2-carboxylic acid or 1-amino-5-sulfobenzene-2-carboxylic acid, and thereafter treating the obtained disazo or polyazo dyestuff in substance or on the fiber with a metal-yielding agent.

The new dyestuffs of the present invention, in the metal-free state, correspond to the formula:

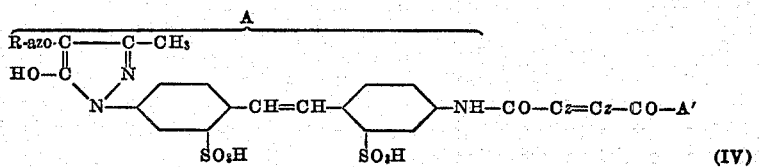

(IV)

wherein R has the hereinbefore-recited significance, one $z$ represents hydrogen, chlorine, bromine, or methyl, while the other $z$ stands for hydrogen, and A′ stands for a moiety of the formula A, wherein R may also represent the ortho-carboxybenzene or ortho-carboxybenzene-meta-sulfonic acid or ortho-carboxybenzene-para-sulfonic acid radical, or the radical of an aminoazo compound of any other desired composition.

Coupling of the aminoazo compounds or of the amino compounds which are capable of coupling, takes place according to the first embodiment of the process of this invention, with the aid of an unsaturated dicarboxylic acid halide of Formula II. Such halides comprise inter alia the dichlorides and dibromides of fumaric acid, maleic acid, methyl-fumaric acid, methyl-maleic acid, chloro-fumaric acid and bromo-fumaric acid. Possible losses due to hydrolysis may be compensated for, if necessary, by using the dicarboxylic acid halide in slight excess.

In carrying out the process, the aminoazo compounds or the amino compounds which are capable of coupling, are dissolved in water and, preferably at low temperature (about 0° to about 30°), are admixed with the dicarboxylic acid halide (II). The mixture is stirred vigorously, care being taken to constantly neutralize liberated hydrogen halide, by the addition of acid-binding agents, such for example as sodium bicarbonate, sodium carbonate, sodium hydroxide, or corresponding lithium or potassium compounds, or alkaline earth metal oxides or carbonates, or suitable tertiary organic amines. The dicarboxylic acid halides can, if desired, be diluted by an inert solvent, such for example as benzene, methylbenzene, chlorobenzene, carbontetrachloride or chloroform. The condensation is completed when free amino groups are no longer detectable, the reaction product may partly or wholly separate out during the reaction with the acid chloride, or it may be isolated from the reaction solution by salting out or by acidification. After being filtered off, it is washed, if necessary, and finally dried.

A homogeneous dyestuff, which is symmetrical in respect of the interconnected amines, is obtained when two mols of the same aminoazo compound (I) are bound together with the aid of one mol of dicarboxylic acid halide (II). When on the other hand, two mols of a mixture of two different aminoazo compounds or a mixture of an aminoazo compound and an amino compound which is capable of coupling, are involved in the condensation, there is obtained a mixture of one asymmetrical and two symmetrical dicarboxylic acid derivatives. The mixture contains as predominating constituent a component of the formula $$x'—y'—z' \quad (V)$$

wherein $x'$ stands for one and $z'$ stands for the other aminoazo compound which is acylated in the amino group or for one and the other amino compound capable of coupling, respectively, and $y'$ stands for the radical of the dicarboxylic acid corresponding to the dicarboxylic acid halide (II). There are also present the two products of the formulae $$x'—y'—x' \quad (VI)$$

and $$z'—y'—z' \quad (VII)$$

The two mutually different aminoazo compounds or the aminoazo compound and amino compound which is capable of coupling, a total of two mols in each case, may be bound together in the proportion 1:1 with one mol of dicarboxylic acid halide (II). However, other mixture proportions such for example as 4:1, 3:1, 2:1, 1:2, 1:3 and 1:4 also yield valuable dyestuffs, including some which are characterized by properties superior to those wherein the mixture proportion is 1:1.

Where the disazo or polyazo dyestuff is built up from an aminoazo compound (I) and an amino compound which is capable of coupling, it can easily be converted into a dyestuff mixture of Formula IV by coupling with a suitable diazo compound.

The dipyrazolone of Formula III, employed in the second process embodiment of the invention, may be prepared, for example, by reacting one mol of a dicarboxylic acid halide of Formula II with two mols of 4-amino-4'-nitrostilbene-2,2'-disulfonic acid, converting the resultant dinitro compound into the corresponding diamino compound and then into the dihydrazino compound, and condensing the latter with an acetoacetic acid alkyl ester. The coupling of the dipyrazolone with the diazo compounds is carried out in aqueous medium, if desired in the presence of organic bases such for example as pyridine and its homologues. The reaction may take place in molecular proportion, provided that there are two mols of diazo compounds per mol of dipyrazolone (III). The two mols of diazo compounds may be constituted by a single compound or by a mixture of two different diazo compounds. In this case also, it is possible to modify the products of the final dyestuff to some extent as desired by changing the proportion of the two different diazo compounds from 1:1 to for example 4:1, 3:1, 2:1, 1:2, 1:3 or 1:4, provided that in each case a total of two mols of mixture of diazo compounds participate in the reaction for each mol of dipyrazolone (III).

In view of the manifold possibilities with respect to the construction thereof, the new dyestuffs may possess almost any desired shade. They dye cotton and fibers of regenerated cellulose, some in the single bath or after-metallizing processes, in shades which are of very good fastness to light and of excellent wet-fastness and many of which are of surprising purity.

The disazo and polyazo dyestuffs can also, in part, be converted in substance into the corresponding metal complex compounds by treatment with metal-yielding (e. g. Cu, Ni) agents. Coppering, for example, may advantageously be carried out, where one of the groups to be metallized is an alkoxy group, under conditions whereby a dealkylating splitting of the alkoxy group takes place. This can be carried out according to methods per se known from the literature, for example by heating with a copper salt in a weakly acid to weakly alkaline aqueous medium, if desired with the use of pressure and/or in the presence of ammonia or organic bases, or it may be carried out in a melt of alkali salts of low molecular aliphatic monocarboxylic acids.

The preparation of disazo and polyazo dyestuffs, metallized in substance, according to the first embodiment of the process, can also be carried out by interconnecting the aminoazo compounds in the form of their metal complex compounds with the dicarboxylic acid halide (II). Where dyestuffs mixtures are being prepared, the two aminoazo components may be singly or simultaneously subjected to metallization and then to condensation with the dicarboxylic acid halide.

The disazo and polyazo dyestuffs, metallized in substances, also dye cotton and fibers of regenerated cellulose in a wide variety of shades, many of which are of high purity and all of which are characterized by very good fastness to light and by excellent wet-fastness properties.

The above described dyestuffs, in like composition, can also be prepared by admixing the individual non-metallized and/or metallized disazo and/or polyazo dyestuffs, the resultant mixtures being in many cases at least equivalent to the hereinbefore-described mixtures, obtained during the manufacture of the dyestuffs.

The following examples set forth represent illustrative embodiments of the invention. In these examples, parts and percentages are by weight, and temperatures are in degrees centigrade.

EXAMPLE 1

26.8 parts of the aminodisazo dyestuff corresponding to the formula

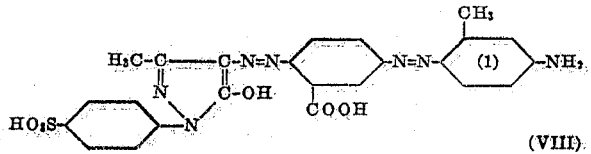

(VIII)

and 30.0 parts of the aminomonoazo dyestuff corresponding to the formula

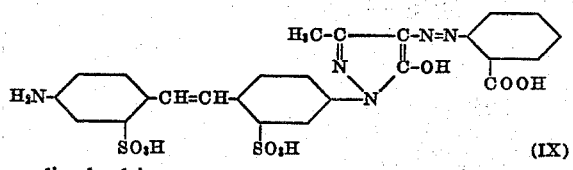

are dissolved in water at room temperature with the addition of aqueous sodium hydroxide solution. Into the resultant solution, there are simultaneously added dropwise and while stirring thoroughly, on the one hand a mixture of 7.7 parts of fumaric acid dichloride and 8 parts of benzene and, on the other hand the requisite amount of aqueous sodium carbonate solution to maintain the reaction of the condensation solution weakly alkaline throughout. After all the fumaric acid dichloride has been added, stirring of the condensation solution is continued until free amino groups can no longer be detected. The resultant disazo dyestuff mixture, the unsymmetrical component of which corresponds to the formula

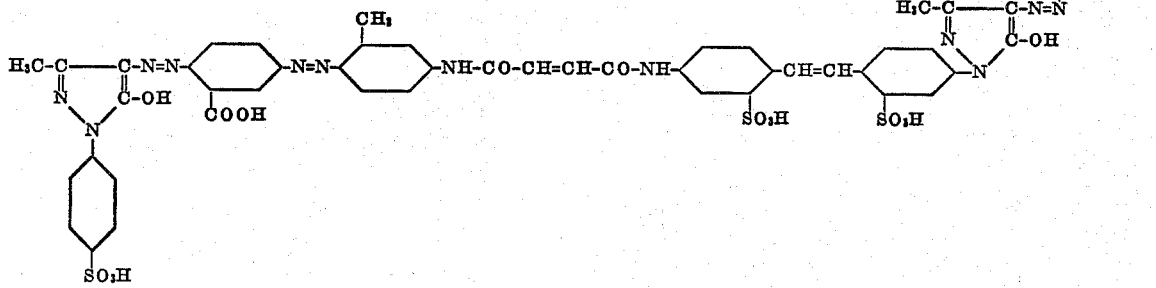

is then precipitated from the warm condensation solution with the aid of sodium chloride, after which the precipitate is filtered off and dried.

The isolated dyestuff mixture, which is a brown powder, dyes cotton and fibres of regenerated cellulose in yellow-orange shades, the fastness properties of which can be improved by aftertreatment with copper-yielding agents.

Dyestuffs of similar properties are obtained when, in the foregoing, the radical (1) of the first of the enumerated reaction components is replaced by another amine of the benzene series which is capable of coupling as for example by the radical of 1-amino-2,5-dimethylbenzene or of 1-amino-2-methoxy-5-methylbenzene or of 1-amino-3-acetylaminobenzene.

EXAMPLE 2

33.3 parts (0.033 mol) of the copper complex compound corresponding to the formula

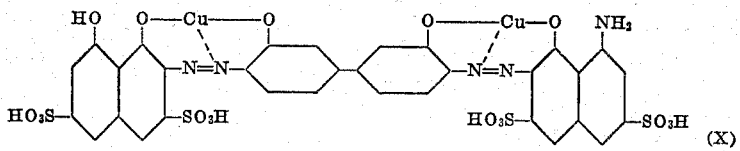

and 49.5 parts (0.067 mol) of the copper complex of the aminoazo compound corresponding to the formula

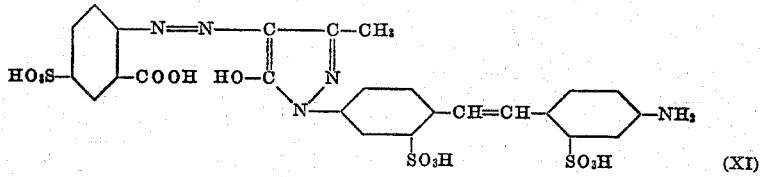

are together dissolved in water with the addition of aqueous sodium hydroxide solution, and then condensed after the manner described in Example 1 with 7.7 parts (0.05 mol) of fumaric acid dichloride. The isolated dyestuff mixture, the unsymmetrical component of which corresponds to the formula

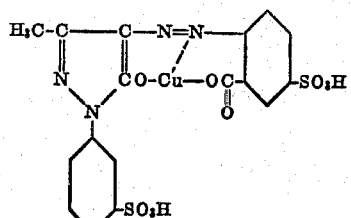

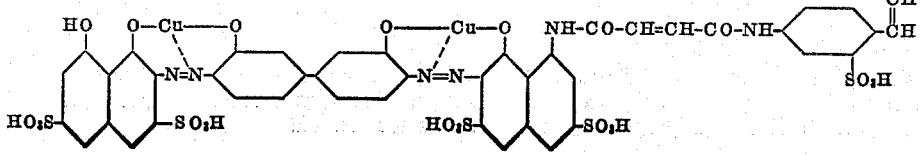

is a dark powder which dyes cotton and fibers of regenerated cellulose in pretty green shade of good fastness to light.

Dyestuffs with similar properties are obtained when in the first-mentioned reaction component, the 1,8-dihydroxynaphthalene-3,6-disulfonic acid moiety is replaced by the 1-hydroxynaphthalene-4-sulfonic acid moiety or by the 2-hydroxynaphthalene-4-sulfonic acid moiety or by the 2-hydroxynaphthalene-6-sulfonic acid moiety or by the 2-hydroxynaphthalene-6,8-disulfonic acid moiety, and/or the 1-amino-8-hydroxynaphthalene-3,6-disulfonic acid moiety is replaced by the 1-amino-8-hydroxynaphthalene-4-sulfonic acid moiety.

EXAMPLE 3

24.7 parts of the aminoazo compound obtained by coupling diazotized 1-amino-3-carboxy-4-hydroxybenzene-5-sulfonic acid with 1-amino-3-acetylaminobenzene, and 30 parts of the aminoazo compound corresponding to Formula IX are dissolved in water with the addition of sodium hydroxide and condensed after the manner described in Example 1 with 7.7 parts of fumaric acid dichloride. The isolated dyestuff mixture, the unsymmetrical component of which corresponds to the formula

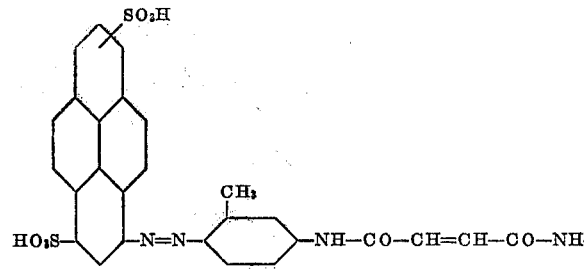

is a brown powder; it dyes cotton and fibers of regenerated cellulose in yellow shades, the fastness properties of which are improved by aftertreatment with copper-yielding agents.

Dyestuffs with similar properties are obtained when, in the first of the aforementioned reaction components, the 1-amino-3-carboxy-4-hydroxybenzene-5-sulfonic acid is replaced by 1-(4'-amino)-benzoylamino-3-carboxy-4-hydroxybenzene-5-sulfonic acid and/or the 1-amino-3-acetylaminobenzene is replaced by one of the other amines of the benzene series enumerated in Example 1.

EXAMPLE 4

24.8 parts of the aminoazo compound obtained by coupling diazotized 3-aminopyrenedisulfonic acid with 1-amino-3-methylbenzene, and 37 parts of the copper complex of the aminoazo compound corresponding to Formula XI are dissolved in water with the addition of aqueous sodiumhydroxide solution, after which condensation is carried out after the manner described in Example 1 with 7.7 parts of fumaric acid dichloride. The isolated dyestuff mixture, the unsymmetrical component of which corresponds to the formula

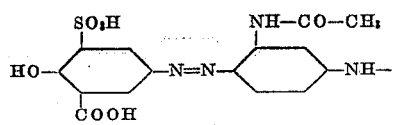

is a yellow brown powder which dyes cotton and fibers of regenerated cellulose in reddish yellow shades of very good fastness to light. Dyestuffs of similar properties are obtained when, in the first of the enumerated reaction components, on the one hand the 3-aminopyrenedisulfonic acid is replaced by an aminonaphthalene-disulfonic acid such for example as 2-aminonaphthalene-4,8-disulfonic acid or 2-aminonaphthalene-6,8-disulfonic acid and/or on the other hand the 1-amino-3-methylbenzene is replaced by another amine of the benzene series such for example as aminobenzene, 1-amino-2-methylbenzene, 1-amino-3-ethylbenzene, 1-amino-2,5-dimethylbenzene, 1-amino-2,5-diethoxybenzene, 1-amino-3-acetylaminobenzene or 1-amino-2-methoxy-5-methylbenzene.

EXAMPLE 5

34 parts of aminoazo compound corresponding to Formula XI and 30.9 parts of the amino azo compound corresponding to the formula

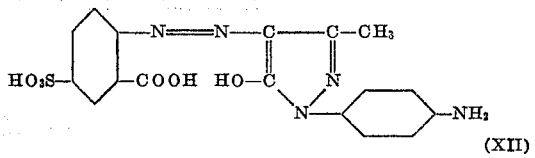

are dissolved in 2000 parts of water containing sodium hydroxide and adjusted to a pH of about 8. After the

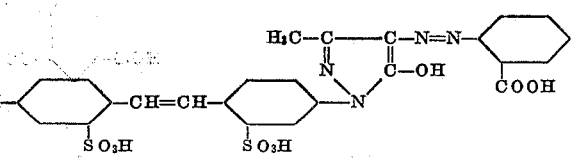

solution has been cooled to 5–8° by the addition of ice, there is added thereto at the said temperature, in the course of 1 to 2 hours and while stirring very thoroughly, a 20% solution of fumaric acid dichloride in chlorobenzene, until free amino groups are no longer detectable. During this operation, the reaction solution is constantly maintained weakly alkaline (pH of about 8) by the dropwise addition of dilute aqueous sodiumhydroxide solution. The reaction solution is then heated to 80° and the resultant mixture of isazo dyestuffs is salted out with sodiumchloride and isolated by filtration.

In order to convert the product into the copper complex compound, it is dissolved in 1000 parts of water at 70–80°. After the addition of 15 parts of sodium acetate to the resultant solution, there is added to the latter, in the course of about 30 minutes and while stirring thoroughly a 20% aqueous copper sulfate solution until copper ions can be detected in a salted out test specimen.

The copper complex compound is then isolated, dried and ground. The unsymmetrical component thereof corresponds to the formula

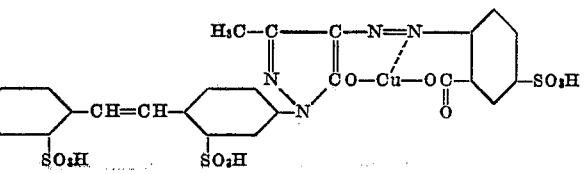

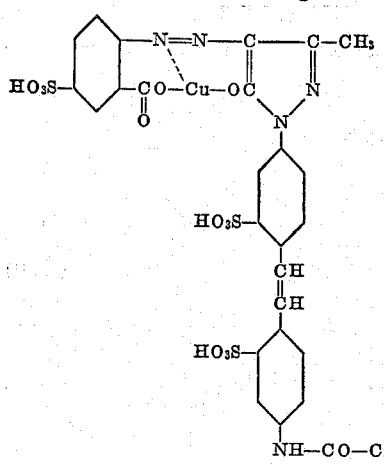

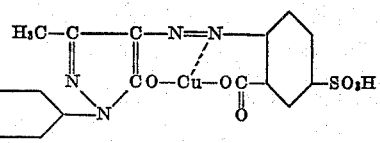

and is a brown powder which dissolves with yellow coloration in water and in concentrated sulfuric acid. Its dyeings on cotton are yellow and are characterized by excellent fastness to light and to wet treatments.

A similar dyestuff which is also characterized by excellent fastness properties is obtained when the aminoazo compound (XII) of the present example is replaced by the equivalent quantity of aminoazo compound corresponding to the formula

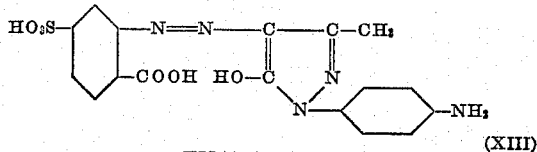

(XIII)

EXAMPLE 6

30 parts of the aminoazo compound corresponding to the formula

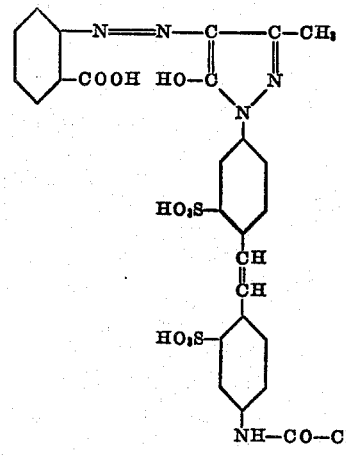

(IX)

and 21 parts of the aminoazo compound corresponding to the formula

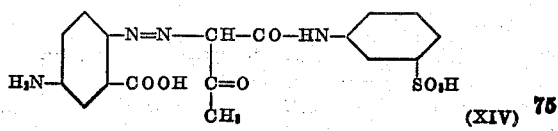

(XIV)

are dissolved in 2200 parts of water with the addition of the necessary quantity of lithium carbonate to achieve complete dissolution. After cooling the resultant solution (pH about 8.0) to 5–10° by the addition of ice, there is added dropwise in the course of 1 to 2 hours and while stirring thoroughly, a 10% solution of fumaric acid dichloride in methylbenzene until free amino groups are no longer detectable. During this operation, the reaction solution is maintained weakly alkaline (pH=8.0) throughout by the suitable addition of a small amount of sodium carbonate. The reaction mixture is heated to 80–90° and the dyestuff isolated after the manner of the previous examples. The unsymmetrical component thereof corresponds to the formula

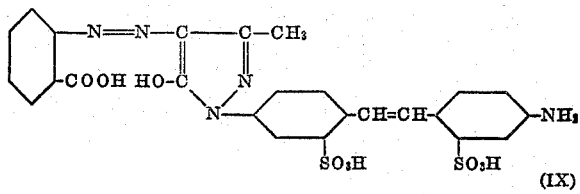

in the dry state, it is a yellow powder which dissolves with yellow coloration in water and in concentrated sulfuric acid. It dyes cotton and fibers of regenerated cellulose in clear yellow shades which, particularly when they are treated with copper-yielding agents, are very fast to light and to wet treatments.

EXAMPLE 7

21 parts of the aminoazo compound which corresponds to the formula

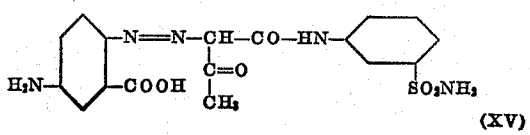

(XV)

and 34 parts of aminoazo compound (XI) are dissolved in 1500 parts of water containing sodium carbonate. The solution is adjusted to a pH of about 8.0 and, at 5–10° in approximately 2 hours and while stirring thoroughly, a 20% solution of symmetrical maleic acid dichloride in benzene is added until the reaction solution contains no more free amino groups. Thereupon the reaction solution is heated to 85° and the resultant mixture of disazo dyestuffs is isolated.

In order to convert the same into the copper complex compound, the method described in Example 5 is carried out.

The isolated, dried and ground copper complex compound, the unsymmetrical component of which corresponds to the formula

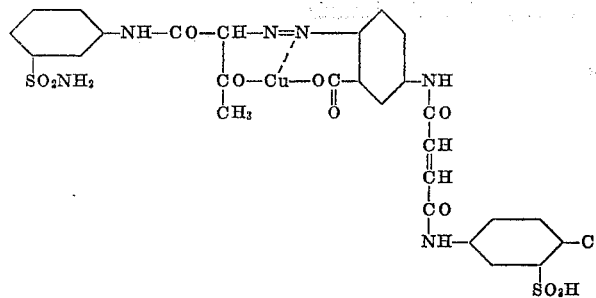

is a brown powder which dissolves with yellow coloration in water and dyes cotton and fibers of regenerated cellulose in clear yellow shades of very good fastness to light and to wet treatments.

Very similar dyestuffs which also have excellent fastness properties are obtained when the aminoazo compound (XV) of the present example is replaced by an equivalent quantity of the compound corresponding to the formula

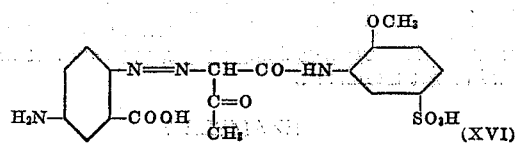

EXAMPLE 8

34 parts of the aminoazo compound corresponding to the formula

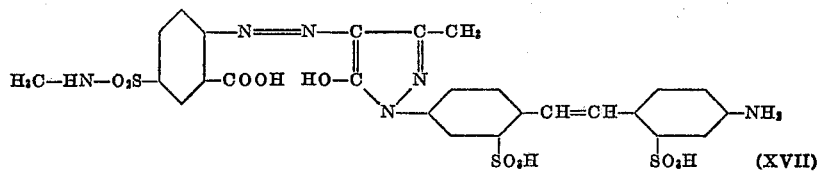

are, in the form of the trisodium salt thereof, dissolved in 1800 parts of water, and then condensed with fumaric acid chloride after the manner described in Example 5. The resultant disazo dyestuff is isolated and converted into the copper complex compound thereof, after the manner hereinbefore described. The product corresponds to the formula

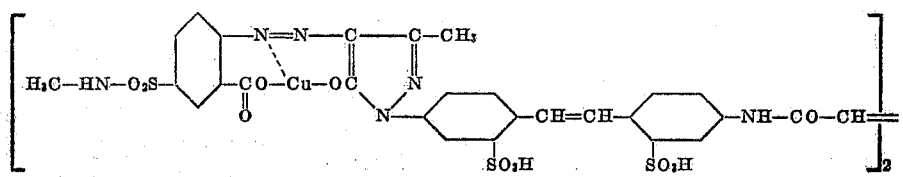

and is a brown powder which dissolves with yellow coloration in water and in concentrated sulfuric acid, and dyes cotton and fibers of regenerated cellulose in pure yellow shades with excellent fastness to light and wet treatments. In order to convert the disazo dyestuff into the nickel

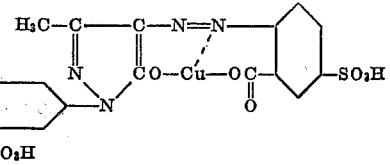

complex compound, 25 parts of the disazo dyestuff are dissolved in 1000 parts of water. 15 parts of crystalline sodium acetate are added to the solution, followed by the addition, at about 70° C. and in the course of 20 to 30 minutes of a 10% aqueous nickel sulfate solution until a permanent excess of nickel (II) ions can be detected. The resultant nickel complex compound is precipitated from the solution by the addition of sodium chloride, after which it is filtered off and dried. The product dyes cotton and fibers of regenerated cellulose in yellow shades of good fastness to light and to wet treatments.

EXAMPLE 9

12.7 parts of the aminoazo compound corresponding to the formula

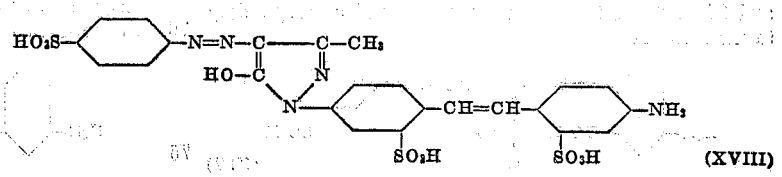

are dissolved in 500 parts of water with the addition of sodium carbonate, and are then subjected to condensation with fumaric acid dichloride after the manner described in Example 5. The thus produced disazo dyestuff is separated and dried. It corresponds to the formula

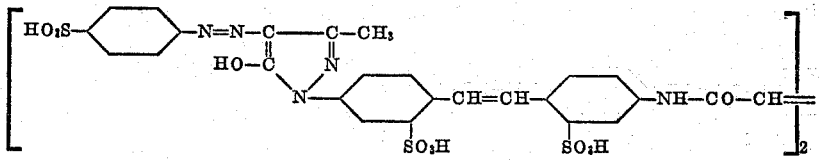

and is a yellow-brown powder which dyes cotton and fibers of regenerated cellulose in yellow shades of good fastness properties.

Dyestuffs of similar properties are obtained when, as starting materials, use is made of aminoazo compounds which contain, as diazo component, in place of the 1-amino-benzene-4-sulfonic acid, 1-aminobenzene-2- or -3-sulfonic acid or the corresponding amide, methylamide or phenylamide.

EXAMPLE 10

15.4 parts of the aminodisazo compound corresponding to the formula

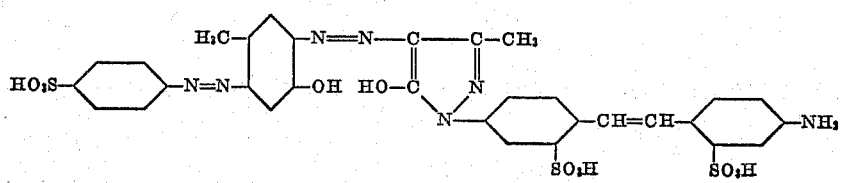

are in the form of the copper complex compound, dissolved in 500 parts of water with addition of sodium carbonate, after which condensation is carried out with fumaric acid dichloride at 10 to 20° in the manner described in Example 5. The thus-produced tetrakisazo dyestuff which corresponds to the formula is a black powder which dissolves with blue-violet coloration in concentrated sulfuric acid and dyes cotton and fibers of regenerated cellulose in brown-violet shades of good fastness properties.

The same dyestuff is obtained when 2 mols of the diazo compound of 4-amino-2-methyl-5 - methoxy-1,1'-azobenzene-4'-sulfonic acid are coupled with 1 mol of the dipyrazolone corresponding to the formula

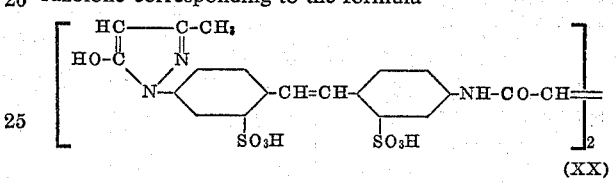

and the resultant tetrakisazo dyestuff subjected to demethylating coppering.

EXAMPLE 11

14.9 parts of the aminoazo compound which corresponds to the formula

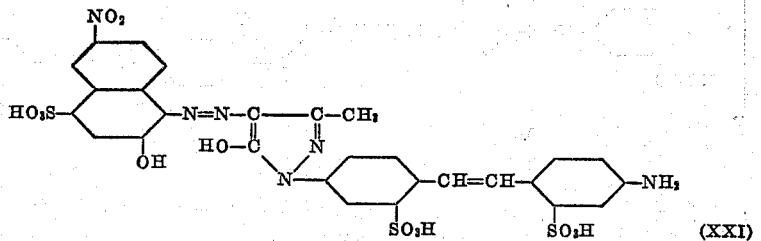

are, in the form of the copper complex compound, dissovled in 300 parts of water with the addition of lithium carbonate and then condensed with fumaric acid di-

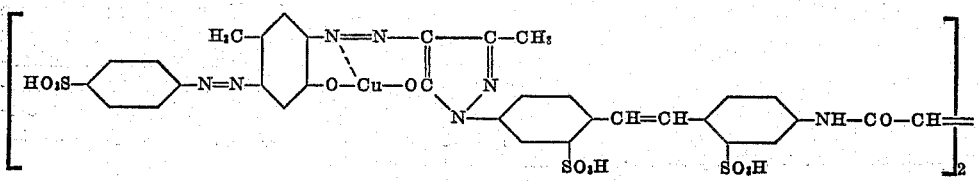

chloride after the manner hereinbefore described. The thus obtained disazo dyestuff corresponds to the formula

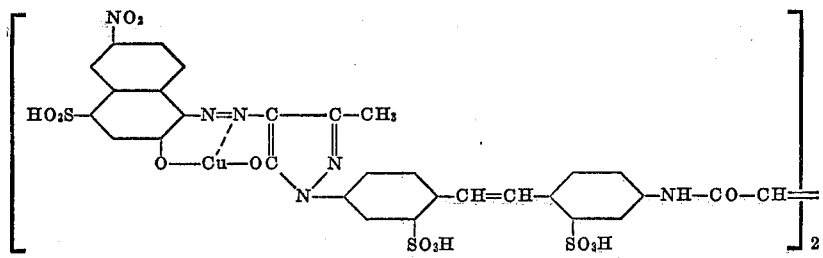

and is a dark brown powder which dissolves with yellowish red coloration in water and in concentrated sulfuric acid, and dyes cotton and fibers of regenerated cellulose in brownish red shades of good fastness properties.

EXAMPLE 12

76.3 parts of the aminodisazo compound which corresponds to the formula

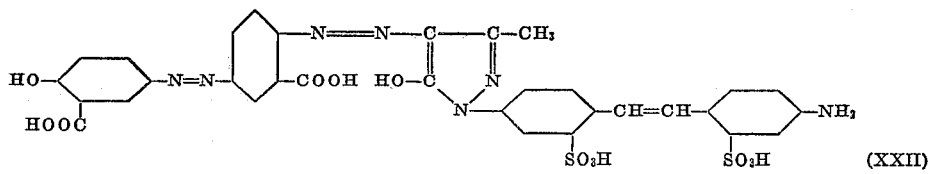

are dissolved in water with the addition of lithium carbonate, and are then condensed with fumaric acid dichloride in the manner described in Example 1. The resultant tetrakisazo dyestuff is salted out at the boil, and is then filtered off and dried. It corresponds to the formula

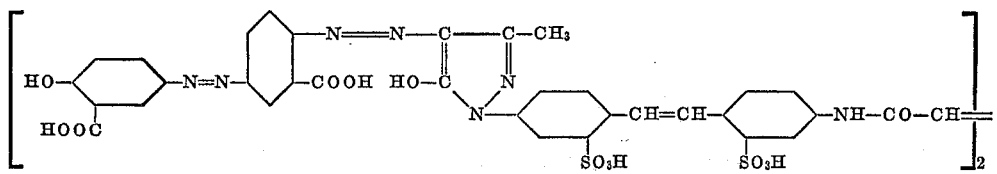

and is a red-brown powder which dissolves with red coloration in water and in concentrated sulfuric acid and dyes cotton and fibers of regenerated cellulose by the after-coppering process in brown-red shades of good fastness properties.

EXAMPLE 13

34 parts of the aminoazo compound (XVII) and 22.6 parts of 1-[4″-aminostilbenyl-(4′)]-3-methyl-5-pyrazolone-2′,2″-disulfonic acid are dissolved in 1500 parts of water with the addition of sodium carbonate and then condensed with 7.7 parts of fumaric acid dichloride after the manner described in Example 1. The resultant mixture is cooled to 0–5° and the diazo suspension from 11.5 parts of 1-amino-2-carboxybenzene-4-sulfonic acid methylamide added thereto. Upon completion of the coupling, the resultant unitary disazo dyestuff is salted out at about 90°, and is then filtered off and dried. It is identical with the product obtained according to Example 8. The copper complex compound thereof, as well as its nickel complex compound, dyes cotton and fibers of regenerated cellulose in yellow shades which are fast to light and to washing. The same dyestuffs are obtained when the 34 parts of the aminoazo compound (XVII) are first converted into the copper (or the nickel) complex compound, and then combined, through the medium of fumaric acid dichloride, with 1-[4″-aminostilbenyl - (4′)] - 3 - methyl - 5 - pyrazolone - 2′,2″ - disulfonic acid, and the resultant intermediate further worked up as previously described. A dyestuff with similar properties is obtained when the 11.5 parts of 1-amino-2-carboxybenzene-4-sulfonic acid methylamide are replaced by 10.9 parts of 1-amino-2-carboxybenzene-4-sulfonic acid. The nickel complex compound, obtained by warming the dyestuff with nickel sulfate in the presence of sodium acetate, dyes cotton and fibers of regenerated cellulose in fast yellow shades.

In the following table, additional dyestuffs are set forth which are prepared after the manner set forth in Examples 1–13. In this connection the fumaric acid dichloride or fumaric acid dibromide can be replaced by symmetrical maleic acid dichloride or methyl-fumaric acid dichloride or dibromide or methyl-maleic acid dichloride or dibromide or chloro- or bromo-fumaric acid dichloride or dibromide. In all cases similar valuable azo dyestuffs are obtained.

In most cases, sodium hydroxide or sodium carbonate is employed as acid-binding agent; however, this agent may with similar success be replaced by lithium carbonate, sodium or potassium acetate or bicarbonate, potassium hydroxide or carbonate, calcium hydroxide or carbonate, magnesium oxide or N,N-dimethylaminobenzene.

Table

[Condensation of 1 mol of fumaric acid dichloride or -dibromide with 2 mols of aminoazo compounds.]

| Example No. (1) | First Aminoazo Compound (2) | Second Aminoazo Compound (3) | Use as— (4) | Shade of the Coppered Dyeing on Cotton (5) |
|---|---|---|---|---|
| 14 | 1 mol (XI) | 1 mol (XXIII) | Copper complex compound | yellow. |
| 15 | ....do.... | 1 mol (XXIV) | ....do.... | Do. |
| 16 | 1 mol (XII) | 1 mol (XVII) | ....do.... | Do. |
| 17 | 0.8 mol (XII) | 1.6 mols (XXV) | ....do.... | Do. |
| 18 | 1 mol (IX) | 1 mol 1-[4'-(2'-methyl-4''-aminobenzeneazo)-benzoyl]-amino-2-hydroxy-3-carboxy-benzene-5-sulfonic acid | After-coppering dyestuff | Do. |
| 19 | ....do.... | 1 mol 1-[4'-(2'-methyl-4''-aminobenzeneazo)-benzoyl]-amino-3-carboxy-4-hydroxy-benzene-5-sulfonic acid | ....do.... | Do. |
| 20 | 1.3 mols (IX) | 0.7 mol 4-amino-4'-hydroxy-1,1'-azobenzene-3'-carboxylic acid | ....do.... | Do. |
| 21 | 1 mol (IX) | 1 mol (XVII) | Copper complex compound | Do. |
| 22 | ....do.... | 1 mol (XXV) | ....do.... | Do. |
| 23 | 1 mol (XXIV) | 1 mol (XXVI) | After coppering dyestuff | reddish yellow. | wherein T = phenyl.

*Table*—Continued

[Condensation of 1 mol of fumaric acid dichloride or -dibromide with 2 mols of aminoazo compounds.]

| Example No. (1) | First Aminoazo Compound (2) | Second Aminoazo Compound (3) | Use as— (4) | Shade of the Coppered Dyeing on Cotton (5) |
|---|---|---|---|---|
| 24 | 1 mol (XXVI), wherein T=butyl | 1 mol (XXXVI), wherein T=butyl | After coppering dyestuff | reddish yellow. |
| 25 | 1 mol (XXVI), wherein T=cyclohexyloxy | 1 mol (XXXVI), wherein T=cyclohexyloxy | do | Do. |
| 26 | 1 mol (XXVI), wherein T=methoxy | 1 mol (XXXVI), wherein T=methoxy | Copper complex compound | Do. |
| 27 | 1 mol (XXVI), wherein T=ethoxy | 1 mol (XXXVI), wherein T=ethoxy | do | reddish yellow. |
| 28 | 1.4 mol copper complex of (XI) | 0.6 mol (XXXVII) | do | yellow-brown. |
| 29 | 1 mol (XI) | 1 mol 2-acetylamino-4-amino-3'-carboxy-4'-hydroxy-1,1'-azo-benzene-5'-sulfonic acid | After coppering dyestuff | yellow. |
| 30 | 1 mol (XVIII) | do | do | Do. |
| 31 | 1.6 mols (XXXVIII) | 0.4 mol 2-acetylamino-4-amino-3'-carboxy-4'-hydroxy-1,1'-azo-benzene-5'-sulfonic acid | do | yellow-brown. |
| 32 | wherein Q=—SO₂NH₂ | 1 mol (VIII) | do | orange. |
| 33 | do | do | do | Do. |
| 34 | 1 mol (XXVIII), wherein Q=methyl | 1 mol 2-acetylamino-4-amino-3'-carboxy-4'-hydroxy-1,1'-azobenzene-5'-sulfonic acid | Copper complex compound | yellow-brown. |
| 35 | 1.6 mols (XXXIX) | 0.4 mol 2-acetylamino-4-amino-3'-carboxy-4'-hydroxy-1,1'-azobenzene-5'-sulfonic acid | After coppering dyestuff | yellow. |

*Table—Continued*

[Condensation of 1 mol of fumaric acid dichloride or -dibromide with 2 mols of aminoazo compounds.]

| Example No. | First Aminoazo Compound | Second Aminoazo Compound | Use as— | Shade of the Coppered Dyeing on Cotton |
|---|---|---|---|---|
| (1) | (2) | (3) | (4) | (5) |
| 36 | 1 mol of the copper complex compound of (XI) | 1 mol (XXX) | Copper complex compound | brownish orange. |
| 37 | ...do... | 1 mol of copper complex compound of (XXVIII), wherein Q=—SO₂—NH—CH₃ | do | orange. |
| 38 | 1 mol (XI) | 1 mol of copper complex compound of (XIX) | do | brown. |
| 39 | ...do... | 1 mol (XXXII) | do | orange. |
| 40 | ...do... | 1 mol (XXXI) | do | yellow-orange. |
| 41 | 1 mol (IX) | 1 mol of copper complex compound of (XXI) | do | orange. |
| 42 | 1.2 mols (XI) | 0.8 mol (1-aminobenzene-2-carboxylic acid —alkaline→ 2-amino-5-hydroxynaphthalene-7-sulfonic acid). | do | Do. |
| 43 | 1.3 mols (XXXII) | 0.7 mol (1-aminobenzene-2-carboxylic acid —alkaline→ 2-amino-5-hydroxynaphthalene-7-sulfonic acid). | do | Do. |

Table—Continued

[Condensation of 1 mol of fumaric acid dichloride or -dibromide with 2 mols of aminoazo compounds.]

| Example No. (1) | First Aminoazo Compound (2) | Second Aminoazo Compound (3) | Use as— (4) | Shade of the Coppered Dyeing on Cotton (5) |
|---|---|---|---|---|
| 44 | 1.1 mols (XXXIII) [structure with H₂NO₃S, OCH₃, HO, N=N-C-C-CH₃, N, SO₃H, CH=CH, SO₃H, NH₂] | 0.9 mol (1-aminobenzene-2-carboxylic acid) ⇌ alkaline 2-amino-5-hydroxynaphthalene-7-sulfonic acid). | Copper complex compound | orange. |
| 45 | 1.1 mols (IX) | do | After coppering dyestuff | yellow-brown. |
| 46 | 1.1 mols (XI) | 0.9 mol (1-hydroxy-2-amino-4-nitrobenzene-6-sulfonic acid ⇌ alkaline 2-amino-5-hydroxy-naphthalene-7-sulfonic acid). | Copper complex compound | red-brown. |
| 47 | do | 0.9 mol (1-hydroxy-2-amino-6-chlorobenzene-4-sulfonic acid ⇌ alkaline 2-amino-5-hydroxy-naphthalene-7-sulfonic acid). | do | yellow-brown. |
| 48 | 1.3 mols (XXXIV) [structure with HO₃S, OH, HO, N=N-C-C-CH₃, N, Cl, SO₃H, CH=CH, SO₃H, NH₂] | 0.7 mol (1-hydroxy-2-amino-6-chlorobenzene-4-sulfonic acid ⇌ alkaline 2-amino-5-hydroxynaphthalene-7-sulfonic acid). | do | brown-yellow. |
| 49 | 1.1 mols (XI) | 0.9 mol (1-hydroxy-2-amino-benzene-4-sulfonic acid ⇌ alkaline 2-amino-5-hydroxynaphthalene-7-sulfonic acid). | do | yellow-brown. |
| 50 | 1.5 mols (XI) | 0.5 mol (1-hydroxy-2-amino-benzene-4-sulfonic acid ⇌ alkaline 2-amino-5-hydroxynaphthalene-7-sulfonic acid). | do | brown-yellow. |

Representative examples are Examples 37 and 45. The dyestuffs according thereto correspond to the formulae:

EXAMPLE 37

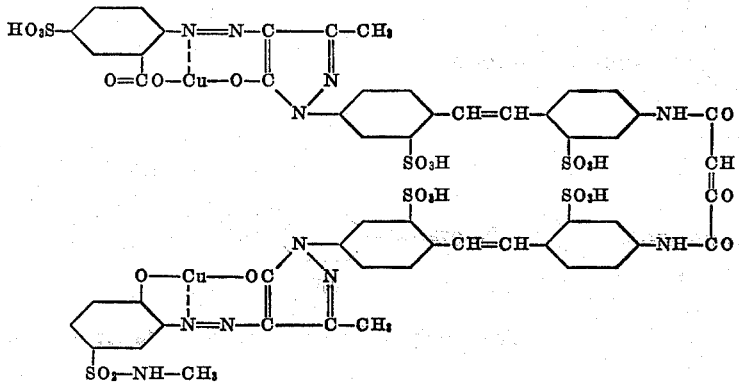

EXAMPLE 45

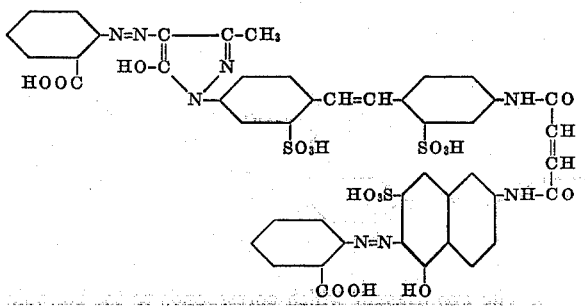

EXAMPLE 51

46 parts of 1-amino-2-carboxybenzene-4-sulfonic acid methylamide are diazotized and coupled in solution which is alkaline with sodium carbonate, with 98.2 parts of the dipyrazolone corresponding to Formula XX. Upon completion of the coupling the reaction mass is warmed, a small quantity of sodium chloride added and the mixture boiled until the dyestuff pulp is converted into a readily filtrable precipitate. This precipitate is filtered off hot, and is then dried. The thus-obtained disazo dyestuff is identical with the product obtained according to Examples 8 and 13. In order to convert the disazo dyestuff into the nickel complex compound, 50 parts of the disazo dyestuff are dissolved in 2000 parts of water. 30 parts of crystalline sodium acetate are added to the solution, after which there is added, at about 70° and in the course of 20–30 minutes, enough of a 10% aqueous nickel sulfate solution so that a permanent excess of nickel (II) ions are detectable. The resultant nickel complex compound is precipitated from the solution by the addition of sodium chloride and is then filtered off and dried. It dyes cotton and fibers of regenerated cellulose in yellow shades of good fastness to light and to wet treatments. Similar dyestuffs are obtained when, on the one hand the fumaryl bridge of the dipyrazolone (XX) is replaced by the methylfumaryl bridge

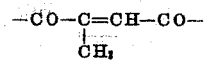

and/or on the other hand, the 46 parts of 1-amino-2-carboxybenzene-4-sulfonic acid methylamide are replaced by 43.4 parts of 1-amino-2-carboxybenzene-4-sulfonic acid amide or a mixture of 23 parts of 1-amino-2-carboxybenzene-4-sulfonic acid methylamide and 21.7 parts of 1-amino-2-carboxybenzene-4-sulfonic acid or a mixture of 21.6 parts of 1-amino-2-carboxybenzene-4-sulfonic acid amide and 13.7 parts of 1-aminobenzene-2-carboxylic acid.

EXAMPLE 52

The diazo compound of 18.8 parts of 1-hydroxy-2-aminobenzene-4-sulfonic acid amide is coupled with 49.1 parts of the dipyrazolone (XX) in a solution which is rendered slightly alkaline by means of sodium carbonate. Upon completion of the coupling which can be accelerated by the addition of pyridine, the disazo dyestuff is separated and dried. It corresponds to the formula

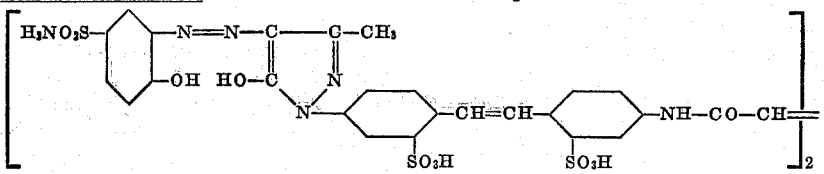

and is a brown powder which dissolves with yellow coloration in water and in concentrated sulfuric acid and dyes cotton and fibers of regenerated cellulose by the after-coppering process in yellow shades of good fastness properties.

Similar dyestuffs are obtained when the dipyrazolone (XX) is coupled with the diazo compound from 1-hydroxy-2-aminobenzene-4-sulfonic acid methylamide or phenylamide or with the diazo compound from a mixture of these amides.

EXAMPLE 53

2 parts of the dyestuff described in Example 1, paragraphs 1 and 2, and 30 parts of sodium sulfate are dissolved in 3000 parts of water at 40–50°. 100 parts of cotton are entered into the thus-prepared dyebath. The bath is heated to boiling in the course of a half hour and is retained at this temperature for a quarter hour, after which it is allowed to cool for a quarter hour. The dyed cotton is then withdrawn and rinsed well.

For after-coppering the dyed material is thoroughly manipulated for a half hour at 70° in a solution of 2 parts of crystalline copper sulfate, 2 parts of concentrated acetic acid and 3000 parts of water, and is then again rinsed and finaly dried. The metallizable dyestuff of the other examples can be dyed in like manner.

EXAMPLE 54

2 parts of the copper complex compound, obtainable according to Example 5, paragraphs 1 to 3, are utilized for dyeing cotton in the manner described in the first paragraph of the preceding example. The thus-obtained dyeing has excellent fastness to light and to wet treatments.

The non-metallizable dyestuffs as well as the other hereinbefore described metalliferous dyestuffs can be dyed in like manner.

Having thus disclosed the invention, what is claimed is:

1. A member selected from the group consisting of azo dyestuffs which correspond to the formula

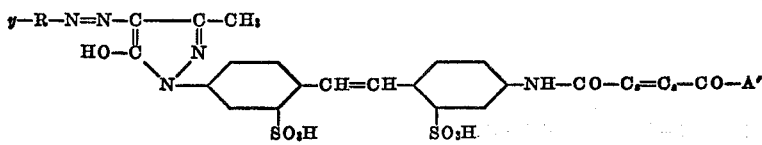

selected from the group consisting of aminomonoazo and aminodisazo compounds.

2. The azo dyestuff which corresponds to the formula

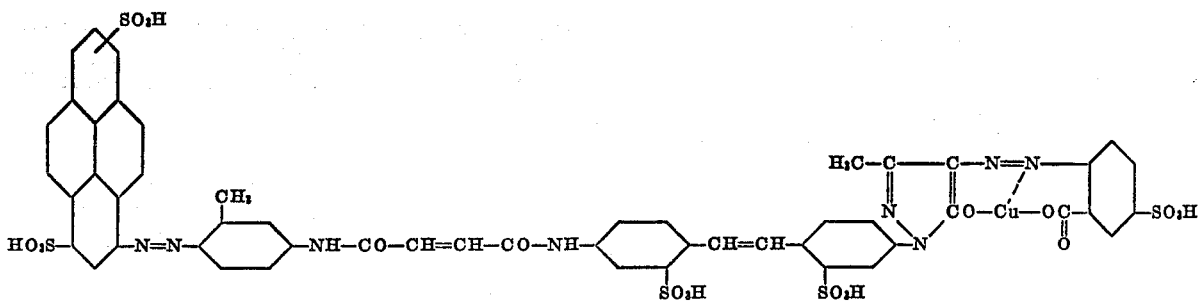

3. The azo dyestuff which corresponds to the formula

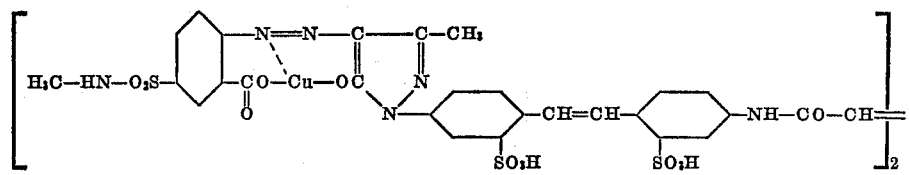

4. The azo dyestuff which corresponds to the formula

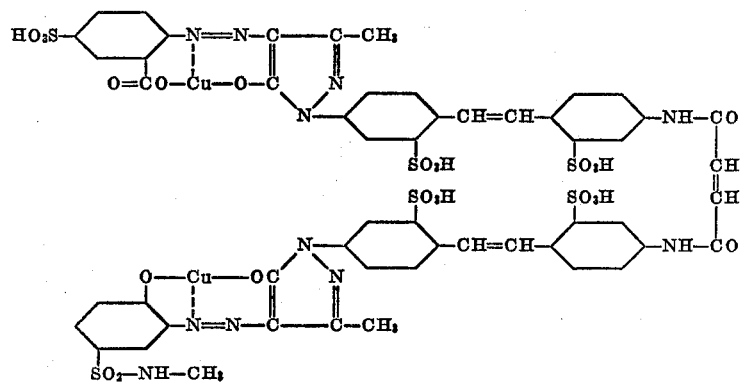

5. The azo dyestuff which corresponds to the formula

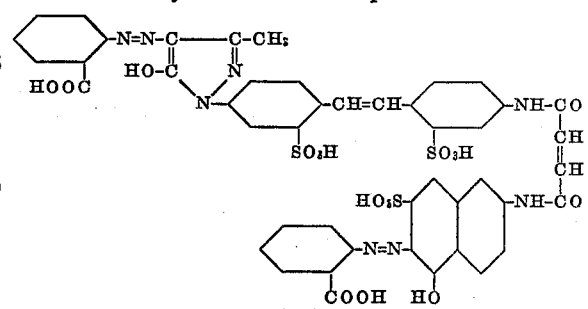

and the copper and nickel complex compounds thereof, wherein $y$ stands for a member selected from the group consisting of hydroxy, methoxy and carboxy, one $z$ stands for a member selected from the group consisting of hydrogen, chlorine, bromine and methyl, the other $z$ stands for hydrogen, R stands for a member selected from the group consisting of radicals of the benzene series and of naphthalene sulfonic acid radicals, said radicals of the benzene series being free from sulfonic acid groups when $y$ is carboxy, and A' represents the radical of a member 6. The azo dyestuff which corresponds to the formula (References on following page)

References Cited in the file of this patent

UNITED STATES PATENTS

| | | |
|---|---|---|
| 2,104,595 | Schirm | Jan. 4, 1938 |
| 2,646,338 | Kappeler et al. | July 21, 1953 |
| 2,734,053 | Grandjean et al. | Feb. 7, 1956 |

FOREIGN PATENTS

| | | |
|---|---|---|
| 504,489 | Belgium | July 31, 1951 |

UNITED STATES PATENT OFFICE
Certificate of Correction

Patent No. 2,817,654                          December 24, 1957

Philippe Grandjean et al.

It is hereby certified that error appears in the printed specification of the above numbered patent requiring correction and that the said Letters Patent should read as corrected below.

Column 4, line 61, for "represent" read —representative—; column 8, line 48, for "isazo" read —disazo—; column 14, line 63, for "sovled" read —solved—; columns 23 and 24, in the table, third column thereof, opposite Example No. 46, for "napthalene" read —naphthalene—; columns 25 and 26, Example 37, the right-hand portion of the formula should appear as shown below instead of as in the patent:

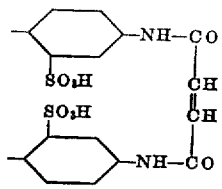

column 26, line 64, for "finaly" read —finally—; column 28, line 3, for "correspond" read —corresponds—.

Signed and sealed this 27th day of May 1958.

[SEAL]

Attest:
KARL H. AXLINE,
*Attesting Officer.*

ROBERT C. WATSON,
*Commissioner of Patents.*